United States Patent
Yang et al.

(10) Patent No.: US 7,525,793 B2
(45) Date of Patent: Apr. 28, 2009

(54) PERIPHERAL FASTENING STRUCTURE FOR FASTENING BOTH CASES OF AN ELECTRONIC DEVICE

(75) Inventors: Yung-Chi Yang, Taipei (TW); You-Fa Luo, Taipei (TW)

(73) Assignee: Inventec Corporation, Taipei (TW)

( * ) Notice: Subject to any disclaimer, the term of this patent is extended or adjusted under 35 U.S.C. 154(b) by 407 days.

(21) Appl. No.: 11/395,927

(22) Filed: Mar. 30, 2006

(65) Prior Publication Data

US 2007/0033770 A1 Feb. 15, 2007

(30) Foreign Application Priority Data

Aug. 10, 2005 (TW) .............................. 94213629 U

(51) Int. Cl.
*G06F 1/16* (2006.01)
*A47B 81/00* (2006.01)

(52) U.S. Cl. ..................... 361/683; 361/680; 312/223.1

(58) Field of Classification Search .................. 361/683, 361/680, 679; 174/50, 520, 559–562; 312/223.1, 312/223.2; 248/346.5, 346.01
See application file for complete search history.

(56) References Cited

U.S. PATENT DOCUMENTS

| | | | |
|---|---|---|---|
| 7,336,503 B2 * | 2/2008 | Yang et al. | 361/801 |
| 2002/0172003 A1 * | 11/2002 | Bang et al. | 361/683 |
| 2007/0029903 A1 * | 2/2007 | Yang et al. | 312/223.2 |
| 2007/0076361 A1 * | 4/2007 | Yin | 361/683 |
| 2007/0076364 A1 * | 4/2007 | Liu et al. | 361/683 |

* cited by examiner

*Primary Examiner*—Jayprakash N Gandhi
*Assistant Examiner*—Nidhi Desai
(74) *Attorney, Agent, or Firm*—Muncy, Geissler, Olds & Lowe, PLLC

(57) ABSTRACT

A peripheral fastening structure for fastening an upper case and a lower case of an electronic device is disclosed. The peripheral fastening structure includes a body frame, a first slot, a top stopper, a lower stopper and a second slot. The body frame has an exposed surface, a first region, a second region and a third region. The first slot is formed in the first region and has a first opening for engaging with a periphery of the upper case. The top stopper is formed in the second region and extended toward the upper case and against the periphery of the upper case. The lower stopper is formed in the second region for engaging with a cavity of the lower case. The second slot is formed in the third region and has a second opening for engaging with a supporting bar of the upper case.

12 Claims, 7 Drawing Sheets

PERIPHERAL FASTENING STRUCTURE FOR FASTENING BOTH CASES OF AN ELECTRONIC DEVICE

FIELD OF THE INVENTION

The present invention relates to peripheral fastening structures, and more particularly, to a peripheral fastening structure for fastening an upper case and a lower case of an electronic device.

BACKGROUND OF THE INVENTION

With the development of electronic technologies, appearance design of a consumer electronic product has become a critical success factor in today's market place. For those electronic products being moved into a more mature phase, to have a nice and firm industrial appearance design have become more important and even replaced the need of functions, as it has become consumer's major consideration when buying an electronic product. For instance, a notebook computer is perhaps an obvious example. As the differences in functions and operating speeds among most products are quite limited, frame design of an enclosure of a computer has become increasingly important in product development. If a peripheral frame with a nicer frame design, a firmer assembly and capable of being disassembled and maintained easily, it has a greater possibilities to become a consumers' most wanted product in the market.

FIG. 6A is an explosive view of a peripheral fastening structure 55 and a notebook computer (for example a keyboard module) according to the prior art. FIG. 6B is a schematic diagram of the peripheral fastening structure 55 and the notebook computer shown in FIG. 6A after the peripheral fastening structure 55 has been fastened to the notebook computer. In FIG. 6A an upper case 50, a lower case 51 are assembled to the peripheral fastening structure 55.

According to the prior art, a predetermined printed circuit board and a computer mechanism are installed between the upper case 50 and the lower case 51 of the keyboard module first, and then the peripheral fastening structure 55 is assembled and fastened to a front case of the keyboard by clamping the upper case 50 and the lower case 51 with hooks, slots and screws of the peripheral fastening structure 55.

Conventional designs as such employ a method of hooks and holes combination, when the user is going to fix or change the members, the process of the same method has to be applied reversely to dissemble and to release the fixed hooks of the framing members at three sides; however, such move is tremendous and inconvenient, and may cause some deformation or breakage of the hooks due to inappropriate use of force applied. Moreover, if the user assembles the frontal framing member too many times, the forces applied center of the hooks may cause material fatigue and thus dramatically reduce its reliability and lifetime.

In addition, such conventional frontal frame may not be fastened firm enough. If strength of fastening is going to be reinforced, then other mechanism members or fastening screw members would be increased inevitably and subsequently aggravate the condition, making it highly inconvenient for assembling the frontal frame; and thereby not meeting most consumers' need and becoming a dilemma for designers of mechanism electronic device.

Therefore, to develop a fastening structure of an enclosure for an electronic, to improve the convenience of assembling the peripheral fastening structure and also to meet the need of firm fastening, have become a desirable problem to be solved in relevant design fields.

SUMMARY OF THE INVENTION

In light of the above prior-art drawbacks, a primary objective of the present invention is to provide a easily assembled/disassembled peripheral fastening structure for an electronic device.

Another objective of the present invention is to provide a peripheral fastening structure capable of closely fastening an upper case and a lower case of an electronic device.

Still another objective of the present invention is to provide a highly reliable peripheral fastening structure for an electronic device.

A further objective of the present invention is to provide a robust peripheral fastening structure for an electronic device.

In accordance with the foregoing and other objectives, the present invention proposes a peripheral fastening structure for fastening an upper case and a lower case of an electronic device. The peripheral fastening structure includes a body frame having an exposed surface, a first region, a second region and a third region; a first slot formed in the first region of the body frame and having a first opening facing toward the upper case for engaging with a periphery of the upper case; a top stopper formed in the second region of the body frame and extended toward the upper case and against the periphery of the upper case; a lower stopper formed in the second region of the body frame and extended toward the lower case for engaging with a cavity of the lower case; and a second slot formed in the third region of the body frame and having a second opening facing toward a second direction opposite to a first direction toward which the exposed surface of body frame is facing for engaging with a supporting bar of the upper case.

The body frame further includes a plurality of hooks for engaging with a plurality of corresponding hook holes of the upper case. The hooks are formed in a region outside of the first region, the second region, and the third region. The opening of the first slot is in a shape corresponding to an appearance of the periphery of the upper case, the top stopper is in a shape corresponding to the appearance of the periphery of the upper case, the lower stopper is in a shape corresponding to an appearance of the cavity of the lower case, and the opening of second slot is in a shape corresponding to an appearance of the supporting bar of upper case.

The exposed surface is a part of the first slot, apart of the top stopper, or a part of the second slot.

Accordingly, the designs of the slots and the stoppers of peripheral frame of the present invention can therefore regulate the horizontal and vertical free movements of the peripheral frame. Thus the present invention has not only the advantages of easy disassembling and firm fastening that such fastening process requiring no strenuous force exertion such as locking or screwing; but also satisfying the demand of highly reliability without damaging the structure, as well as solving the defects of the conventional structures.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Preferred embodiments of a peripheral fastening structure for an electronic device proposed in the present invention are described in detail as follows with reference to FIG. 1 and FIGS. 5A to 5C.

Figure 1:
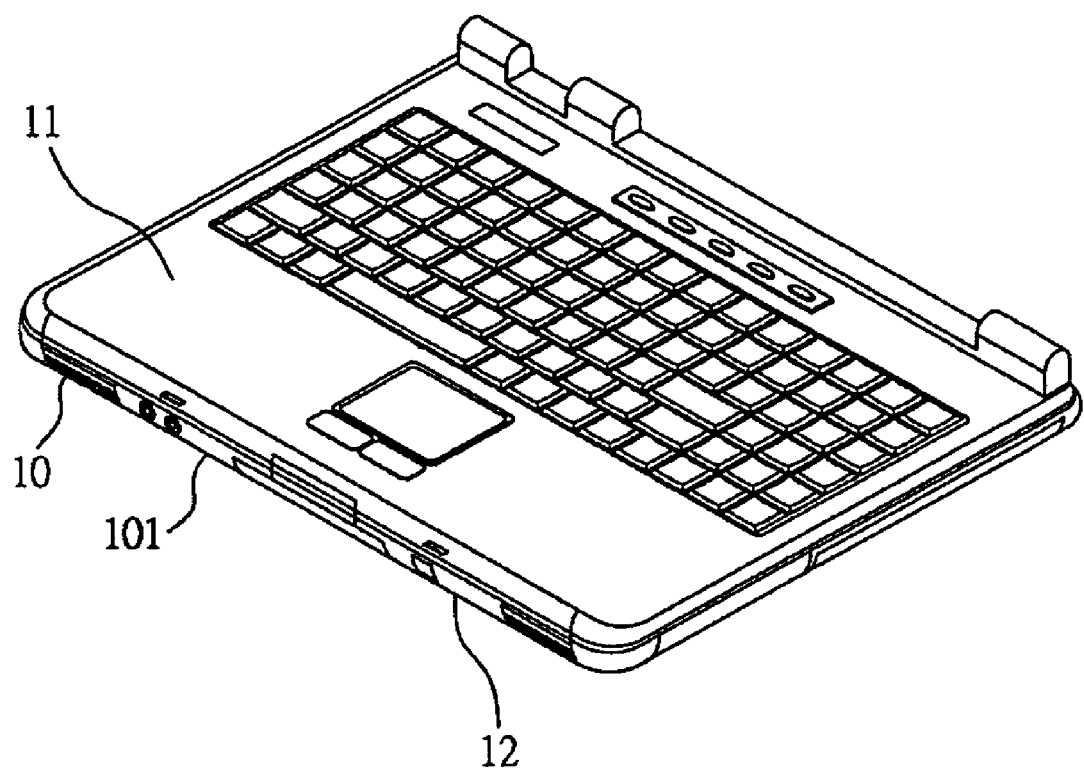
FIG. 1 is a schematic diagram of a peripheral fastening structure and a notebook computer after the peripheral fastening structure has been fastened to the notebook computer of the preferred embodiment according to the present invention.

The present invention provides a peripheral fastening structure for fastening both cased of an electronic device. FIG. 1 is a schematic diagram of a peripheral fastening structure 10 and an electronic device after the peripheral fastening structure 10 has been fastened to an upper case 11 and a lower case 12 of the electronic device. The electronic device is for example a notebook computer. A body frame 100 of the peripheral fastening structure 10 comprises an exposed surface 101 as an outward exposed housing of the electronic device after the peripheral fastening structure 10 has been assembled to the electronic device.

Figure 2:
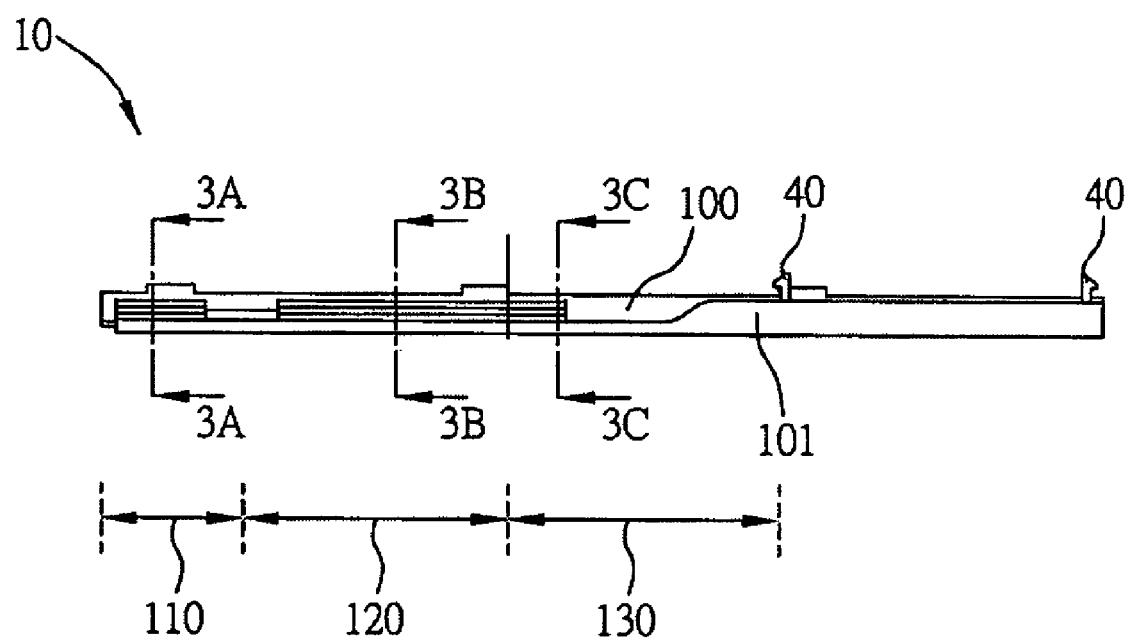
FIG. 2 is a top view of the peripheral fastening structure shown in FIG. 1.

FIG. 2 is a top view of the peripheral fastening structure 10. The peripheral fastening structure 10 comprises the body frame 100, which comprises the exposed surface 101 as aforementioned. The body frame 100 further comprises at least a first region 110, a second region 120 and a third region 130, all of these regions having cross-sectional structures made corresponding to the upper case 11 or the lower 12 case of the electronic device and being different from one another, as shown in FIGS. 3A to 3C.

Figure 3A:
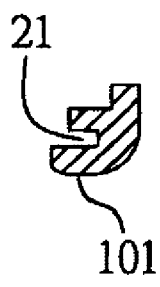
FIGS. 3A to 3C are cross-sectional views of a first region, a second region and a third region of the peripheral fastening structure shown in FIG. 1.
Figure 3B:
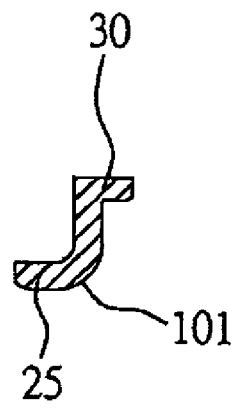

The peripheral fastening structure 10 further comprises a first slot 21 formed in the first region 110 of the body frame 100, as shown in FIG. 3A. The first slot 21 has a first opening upward facing toward the upper case 11 for fastening to a periphery 31 of the upper case 11. The peripheral fastening structure 10 further comprises a top stopper 25 formed in the second region 120 of the body frame 100, as shown in FIG. 3B. The top stopper 25 is extended toward the upper case 11 and against the periphery 31 of the upper case 11. At a corresponding side of the top stopper 25, a lower stopper 30 is formed in the second region 120 of the body frame 100 and extended toward the lower case 12 for engaging with a cavity 32 of the lower case 12.

Figure 3C:
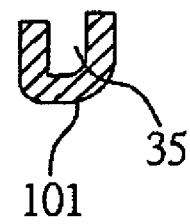

Moreover, the peripheral fastening structure 10 further comprises a second slot 35 formed in the third region 130 of the body frame 100, as shown in FIG. 3C. The second slot 35 has a second (inward) opening facing toward a second direction opposite to a first direction toward which the exposed surface 101 of body frame 100 is facing for engaging with a supporting bar 36 of the upper case 11 (referring to FIG. 4, which shows a top view of the upper case 11), so as to fasten the upper case 11 and the exposed surface 101 of the body frame 100 to the lower case 120 to form the housing of the electronic device, as shown in FIG. 1.

It can been seen from FIG. 2 that the exposed surface 101 is parts of the first slot 21, the top stopper 25 and the second slot 35, respectively.

Figure 4:
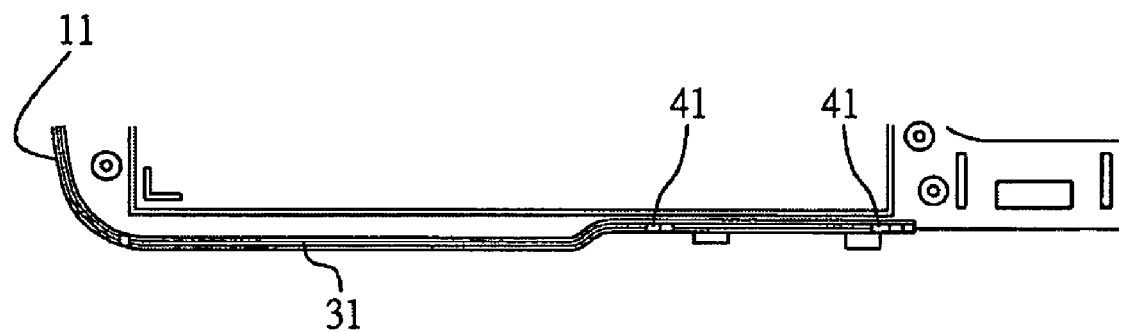
FIG. 4 is a top view of an upper case of the notebook computer shown in FIG. 1.

In addition to the foregoing members employed for fastening the upper case 11 and the lower case 12, the body frame 100 of the peripheral fastening structure 10 further comprises a plurality of hooks 40 for engaging with their corresponding holes 41 of the upper case 11 (referring to FIG. 4, which shows the top view of the upper case 11). The hooks 40 are formed in a region outside of the first region 110, the second region 120, and the third region 130.

Figure 5A:
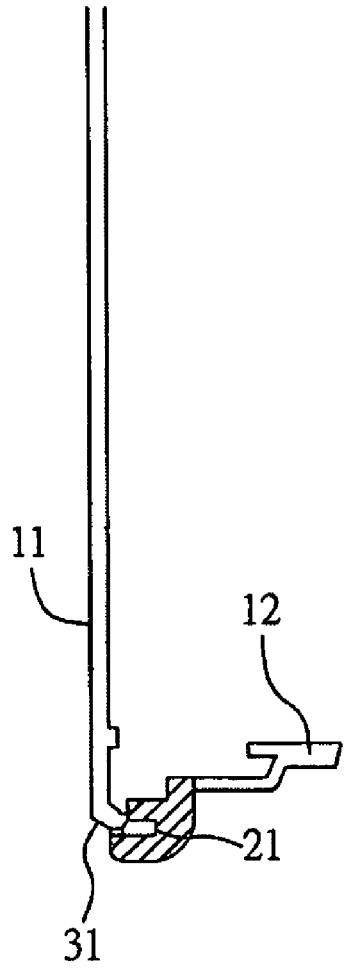
FIGS. 5A to 5C are cross-sectional views of the first region, the second region and the third region shown in FIGS. 3A to 3C when being fastened to the notebook computer.
Figure 5B:
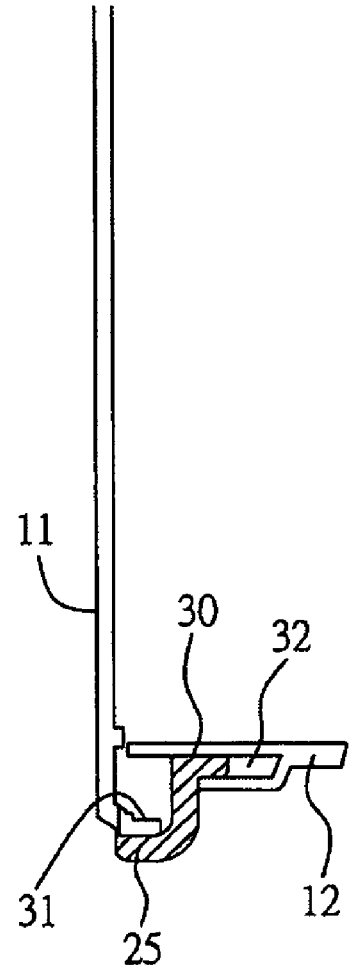
Figure 5C:
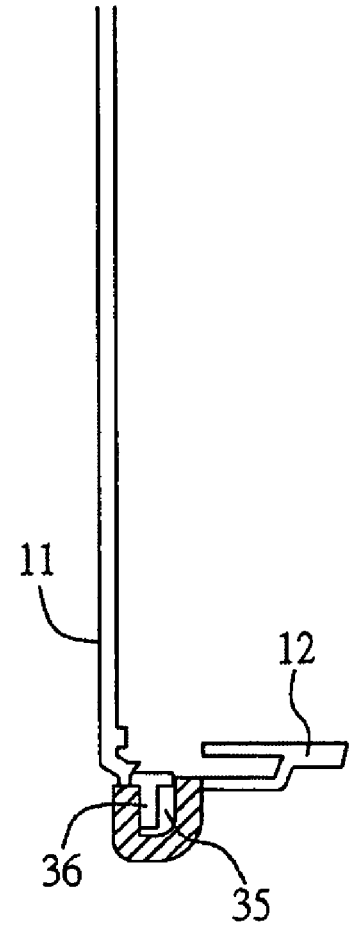
Figure 6A:
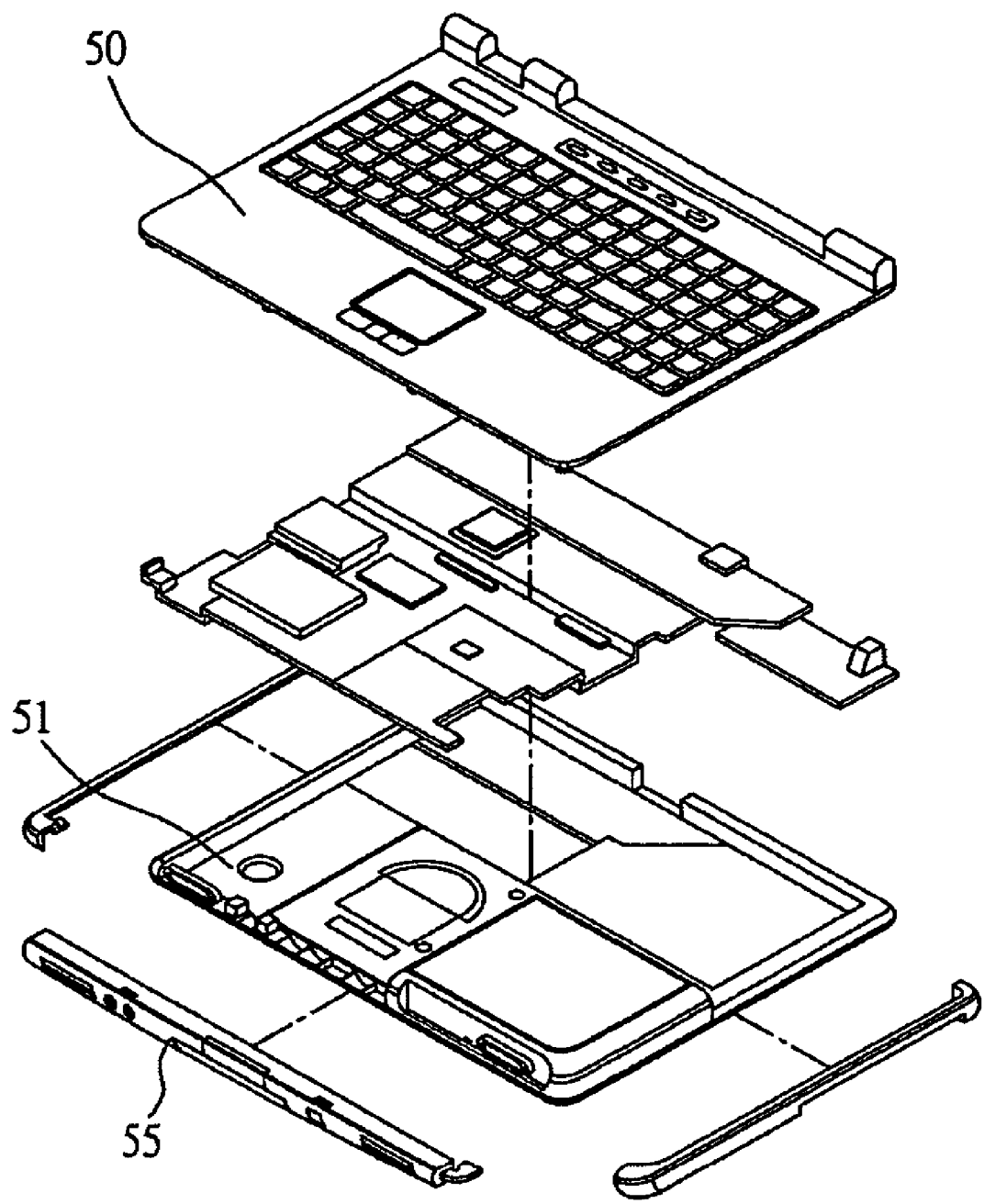
FIG. 6A is an explosive view of a peripheral fastening structure and a notebook computer according to the prior art.
Figure 6B:
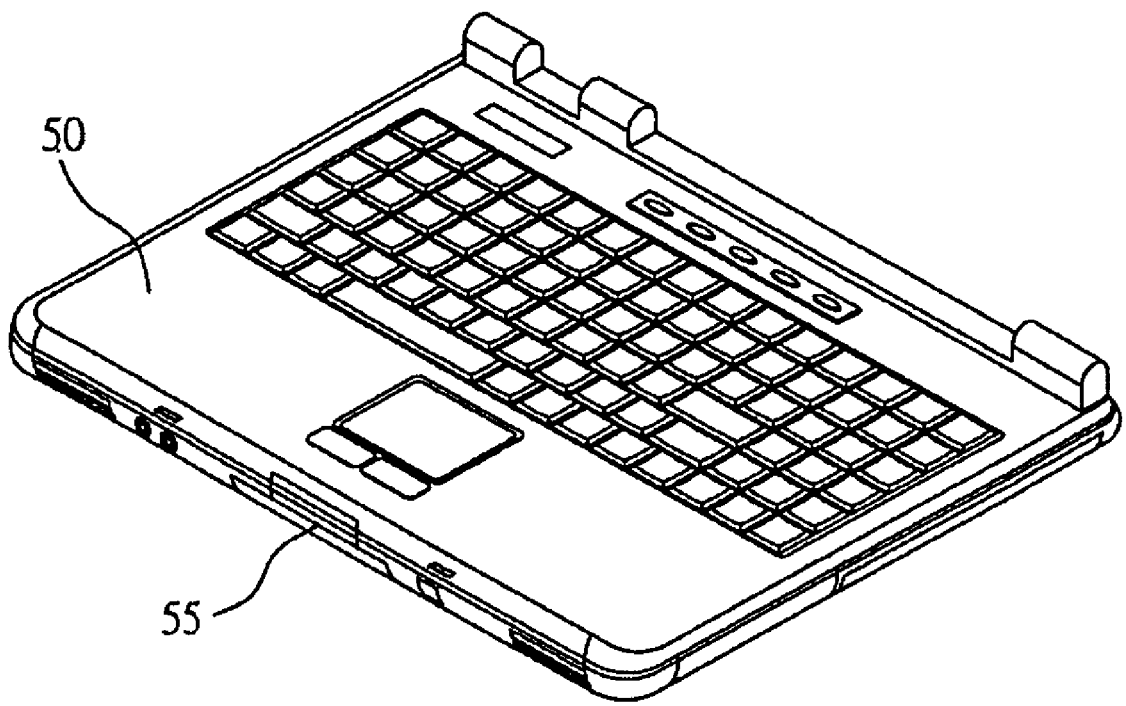
FIG. 6B is a schematic diagram of the peripheral fastening structure and the notebook computer shown in FIG. 6A after the peripheral fastening structure has been fastened to the notebook computer.

Therefore, when the peripheral fastening structure 10 is assembled and fastened to the upper case 11 and the lower case 12, the members in the first region 100, the second region 120 and the third region 130 are fastened to the upper case 11 and the lower case 12 respectively, as shown in FIGS. 5A, 5B and 5C. Meanwhile, the first opening of the first slot 21 is fastened to the periphery 31 of the upper case 11, the lower stopper 25 is attached to the periphery 31 of the upper case 11, and the second slot 35 is fastened to the supporting bar 36 of the upper case 11, so as to performing a simple and easy assembling process.

As shown in FIGS. 3A to 3C, the first opening of the first slot 21 is in a shape corresponding to the periphery 31 of the upper case 11, the top stopper 25 is in a shape corresponding to the periphery 31 of the upper case 11, the lower stopper 30 is in a shape corresponding to the cavity 32 of the lower case 12, and the second opening of second slot 35 is in a shape corresponding to the supporting bar 36 of upper case 11. Accordingly, the shapes of these cavities and stoppers are determined by the upper and lower cases of electronic device, so that by utilizing the relationship of such corresponding locations the free movements thereof can be regulated; nevertheless, such embodiment is not the only design of its appearance.

According to the preferred embodiment, the electronic device is a keyboard module of a notebook computer. Therefore, when the peripheral fastening structure 10 is assembled and fastened to the electronic device, a predetermined printed circuit board and a computer mechanism are enclosed between the upper case 11 and the lower case 12. The computer device further comprises a plurality keys of the keyboard module installed on the upper case 11 and a battery component installed on the lower case 12.

The present invention uses the designs of the cavities and the stoppers of the peripheral frame to limit the free movement of the periphery framing horizontally and vertically, which not only has not only the advantages of easy disassembling and firm fastening that such fastening process requiring no strenuous force exertion such as locking or screwing; but also sufficiently satisfying the demand of highly reliability without damaging the structure, as well as solving the defects of employing conventional structures.

The invention has been described using exemplary preferred embodiments. However, it is to be understood that the scope of the invention is not limited to the disclosed embodiments. On the contrary, it is intended to cover various modifications and similar arrangement. The scope of the claims therefore should be accorded the broadest interpretation so as to encompass all such modifications and similar arrangements.

What is claimed is:

1. A peripheral fastening structure for fastening an upper case and a lower case of an electronic device, the peripheral fastening structure comprising:
   a body frame having an exposed surface, a first region, a second region and a third region;
   a first slot formed in the first region of the body frame, and having a first opening facing toward the upper case for engaging with a periphery of the upper case;
   a top stopper formed in the second region of the body frame and extended toward the upper case and against the periphery of the upper case;
   a lower stopper formed in the second region of the body frame and extended toward the lower case for engaging with a cavity of the lower case; and
   a second slot formed in the third region of the body frame and having a second opening facing toward a second direction opposite to a first direction toward which the exposed surface of the body frame is facing, the second opening for engaging with a supporting bar of the upper case, wherein the electronic device is a keyboard module of a notebook computer.

2. The peripheral fastening structure of claim 1, wherein the body frame further comprises a plurality of hooks for engaging with a plurality of corresponding hook holes of the upper case.

3. The peripheral fastening structure of claim 2, wherein the hooks are formed in a region outside of the first region, the second region and the third region.

4. The peripheral fastening structure of claim 1, wherein the first opening of the first slot is in a shape corresponding to an appearance of the periphery of the upper case.

5. The peripheral fastening structure of claim 1, wherein the top stopper is in a shape corresponding to an appearance of the periphery of the upper case.

6. The peripheral fastening structure of claim 1, wherein the lower stopper is in a shape corresponding to an appearance of the cavity of the lower case.

7. The peripheral fastening structure of claim 1, wherein the second opening of the second slot is in a shape corresponding to an appearance of the supporting bar of the upper case.

8. The peripheral fastening structure of claim 1, wherein the exposed surface is a part of the first slot.

9. The peripheral fastening structure of claim 1, wherein the exposed surface is a part of the top stopper.

10. The peripheral fastening structure of claim 1, wherein the exposed surface is a part of the second slot.

11. The peripheral fastening structure of claim 1, wherein the electronic device further comprises a circuit board installed between the upper case and the lower case.

12. The peripheral fastening structure of claim 1, wherein the electronic device further comprises a mechanism element installed between the upper case and the lower case.

* * * * *